United States Patent [19]

Suzuki et al.

[11] Patent Number: 5,041,722
[45] Date of Patent: Aug. 20, 1991

[54] METHOD OF GUIDING MOVEMENT OF UNMANNED VEHICLE BY FOLLOWING A NUMBER OF LUMINOUS POINTS

[75] Inventors: Toru Suzuki; Mitsuo Hosoi, both of Kanagawa, Japan

[73] Assignee: Kabushiki Kaisha Komatsu Seisakusho, Toyko, Japan

[21] Appl. No.: 377,861
[22] PCT Filed: Nov. 14, 1986
[86] PCT No.: PCT/JP86/00583
 § 371 Date: Jul. 7, 1989
 § 102(e) Date: Jul. 7, 1989
[87] PCT Pub. No.: WO88/03675
 PCT Pub. Date: May 19, 1988

[51] Int. Cl.⁵ ............................................. G05B 1/00
[52] U.S. Cl. ................................... 250/202; 180/168
[58] Field of Search ............... 250/221, 222.1, 202; 180/167–169; 901/1, 47; 364/424.01, 424.02

[56] References Cited

U.S. PATENT DOCUMENTS 3,738,443  6/1973  Kubo ................................. 180/168
4,099,591  7/1978  Carr ................................. 180/168
4,278,142  7/1981  Kono ................................. 180/168
4,566,032  1/1986  Hirooka et al. ...................... 180/168
4,716,530  12/1987  Ogawa et al. ....................... 180/168

Primary Examiner—David C. Nelms
Assistant Examiner—K. Shami
Attorney, Agent, or Firm—Diller, Ramik & Wight

[57] ABSTRACT

An improved method of guiding the movement of an unmanned vehicle. A number of luminous points are arranged on a movement passage for the unmanned vehicle in the form of an arrangement pattern indicative of informations on the purpose of guiding. A visual sensor mounted on the unmanned vehicle detects the luminous points to reveive the informations on the purpose of guiding therefrom so that the movement of the unmanned vehicle is guided on the basis of the informations on the purpose of guiding which have been received in that way. According to a system of giving to the unmanned vehicle informations on the purpose of guiding in dependence on a manner of arranging luminous points, a number of informations on the purpose of guiding can be transmitted to the unmanned vehicle. Moreover, an area occupied especially by the marks for the purpose of guiding on the movement passage can be reduced much more than the conventional method.

6 Claims, 6 Drawing Sheets

⇓ BINARIZATION

⇓ BINARIZATION

X : BOUNDARY POSITION ON SCANNING LINE

Y : SCANNING LINE POSITION

FIG.11(a)
STOP

FIG.11(b)
RIGHT TURN

FIG.11(c)
LEFT TURN

FIG.11(d)
T-SHAPED PASSAGE

FIG.11(e)
CROSSING

FIG.11(f)
HIGH SPEED
WIDTH INDICATING HIGH SPEED

FIG.11(g)
LOW SPEED
WIDTH INDICATING LOW SPEED

METHOD OF GUIDING MOVEMENT OF UNMANNED VEHICLE BY FOLLOWING A NUMBER OF LUMINOUS POINTS

TECHNICAL FIELD

The present invention relates to a method of guiding the movement of an unmanned vehicle such as an unmanned conveying vehicle, a movable robot or the like.

BACKGROUND ART

To guide the movement of an unmanned vehicle, the following systems have been heretofore employed.

(1) Guiding system using a natural scenery

This system is such that a linear image extending along the movement passage (e.g., image representative of the boundary between the floor surface and the wall surface) is extracted by image processing means from the image representative of the natural scenery taken by a television camera mounted on a vehicle in a region where the latter is planned to move and the vehicle is then steered in such a manner that the linear image appears at a predetermined position on the image plane of the television camera at all times.

(2) Dotted line following system

Instead of the placement of a linear line for the purpose of guiding on the movement passage where a vehicle is planned to move, a number of reflective plates in the form of white lines, tapes or the like are placed along the movement passage at substantially equal distances to build a row of guiding marks. As the vehicle successively approaches the locations where the respective reflective plates are placed, it is caused to move along the movement region where it is planned to move.

(3) Guiding system using reflective plates having bar codes placed thereon

A number of reflective plates each including bar codes are placed on the movement passage where a vehicle is planned to move. The respective bar codes have informations on operating conditions, crossings, stop points and so forth stored therein and these informations are detected by visual image detecting means such as a television camera or the like mounted on the vehicle. The vehicle is then caused to move linearly, turn or stop in compliance with the detected informations so that it moves on the movement passage where it is planned to move.

(4) Guiding method using reflective plates which are characteristic in geometrical configuration A number of reflective plates each having a characterizing feature in geometrical configuration are placed on the movement passage where a vehicle is planned to move. The geometrical configuration of the respective reflective plates has informations on operating conditions, crossings, stop points or the like involved therein and these informations are detected by visual image detecting means such as a television camera or the like. Then, the vehicle is caused to move linearly, turn or stop in compliance with the detected informations so that it moves on the movement passage where it is planned to move.

However, it has been found that the aforementioned conventional systems (1), (2), (3) and (4) have the following drawbacks.

(As to the system (1))

To extract the linear line indicative of the movement passage from the image, a huge quantity of calculations are required for performing a step of image processing. Consequently, an excessively long time is consumed for calculations, when a processing speed available for calculation processing means dimensioned so as to allow it to be mounted on a vehicular body is employed for them. For the reason, if the vehicle is operated at a high speed, there arises a large amount of deviation between the vehicle position derived from calculations and the actual vehicle position on completion of the calculations. Accordingly, if the system (1) is employed, the vehicle should be caused to move at a very slow speed, resulting in a practical vehicular speed failing to be obtained.

(As to the system (2))

With this system, there is a need of placing a dotted line which extends along a curved part of the movement passage. In addition, there is a need of arranging a number of marks at short distances on all the movement passage where a vehicle is planned to move. Thus, an excessively long time is required for arrangement of the marks.

As to the systems (3) and (4))

According to the systems (3) and (4), a method of operating a vehicle or an information on the current position assumed by a vehicle is represented in dependence on the marks pattern or shape. If a part of the marks become dirty or is injured, informations required for guiding the movement of the vehicle are lost with the result that essential informations can not be transmitted exactly. Accordingly, no person should walk on the marks and no vehicle should move on the same too. To prevent the marks from becoming dirty or being injured, person should walk while avoiding the marks but they are designed in large dimensions and occupy a wide area on the road. This leads to a practical drawback that person walks with much difficulties. It should be added that if marks having small dimensions are used, it is difficult to read informations.

DISCLOSURE OF THE INVENTION

According to the present invention, a number of luminous points are previously arranged on the movement passage of an unmanned vehicle in the form of an arrangement pattern representative of informations on the purpose of guiding thereof. A visual scenery mounted on the unmanned vehicle detects the luminous points to receive the foregoing informations, whereby the movement of the unmanned vehicle is guided on the basis of the received informations on the purpose of guiding.

BRIEF DESCRIPTION OF THE DRAWINGS

FIGS. 4 and 5 are a schematic view illustrating by way of example an arrangement of light emitting means and a television camera, respectively, wherein FIG. 4 shows a case where a half mirror is used and FIG. 5 shows a case where no half mirror is used, FIG. 6 is a schematic view illustrating for the purpose of reference a directional property of light reflected from a reentrant reflective body, FIGS., 7(a), 7(b) and 7(c), (d) are views similar to FIGS. 2 and 3, respectively wherein FIGS. 11(a) through 11(g) are views illustrating by way of example an arrangement pattern of luminous points indicative of informations on an operation command, respectively.

BEST MODE FOR CARRYING OUT THE INVENTION

Now, the present invention will be described in detail hereinafter with reference to the accompanying drawings which illustrate preferred embodiments thereof.

Figure 1:
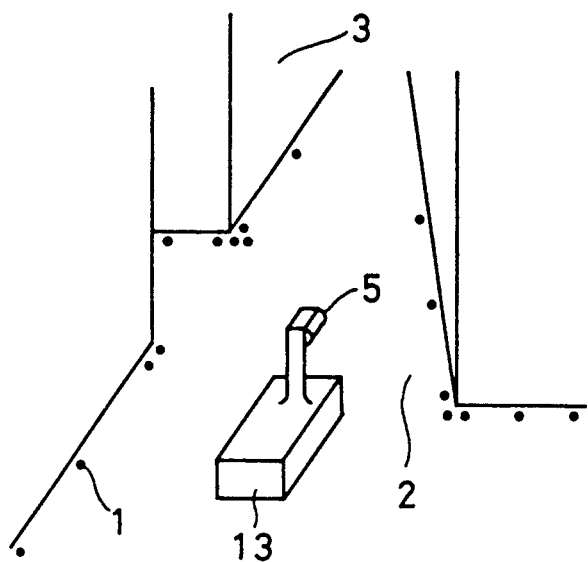
FIG. 1 is a perspective view schematically illustrating a manner of guiding the movement of an unmanned vehicle in accordance with the present invention.

As shown in FIG. 1, the illustrated embodiment is applicable to a case where the movement of an unmanned vehicle 13 along a passage 2 is guided.

Figure 2:
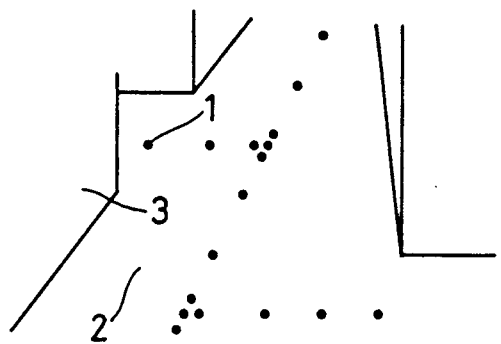
FIGS. 2 and 3 are a perspective view illustrating by way of example a manner of arranging a number of luminous points, respectively.
Figure 3:
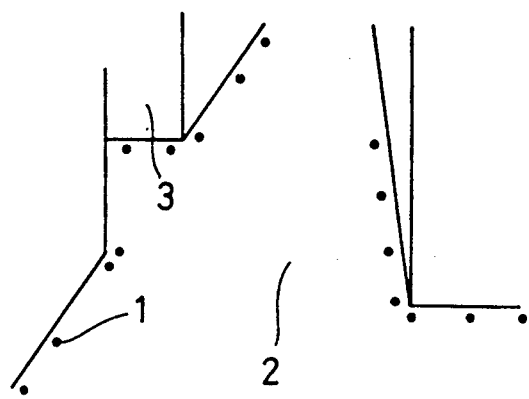

FIG. 2 shows by way of example an arrangement of a number of luminous points 1 along the passage 2 in a central region of the latter, while FIG. 3 shows by way of example an arrangement of a number of luminous points 1 along the boundary extending between the floor surface and the wall surface.

Guide informations to be given to the vehicle 13 are involved in the arrangement of the luminous points 1. Referring to FIGS. 2 and 3 again, the respective luminous points 1 arranged in a substantially equally spaced relationship along the passage 2 are adapted to give to the vehicle 13 informations on the movement passage that a line extending between adjacent luminous points is indicative of a segment of movement passage for the vehicle 13.

FIGS. 11(a) through (g) show by way of example several patterns of arrangement of luminous points 1 for the purpose of providing operation command informations for the vehicle.

If a number of luminous points 1 are arranged on the passage 2 in compliance with the arrangement pattern as shown in one of the drawings, this means that an operation command information represented by the arrangement pattern is given to the vehicle 13.

Incidentally, as shown in FIGS. 11(f) and 11(g), a row of luminous points 1 arranged along the passage 2 to represent informations on the movement passage functions as informations on a speed command to be given to the vehicle with respect to an arrangement interval between adjacent luminous points 1 (indicative of a width at a high speed and a width at a low speed).

Glass bead, corner cube, small-sized reflective plate, reflective sheet piece and small-sized luminous member (LED, bulb or the like) each of which is inexpensive, can easily be placed and has excellent durability and reentrant reflectivity are employable for the luminous points 1.

Figure 4:
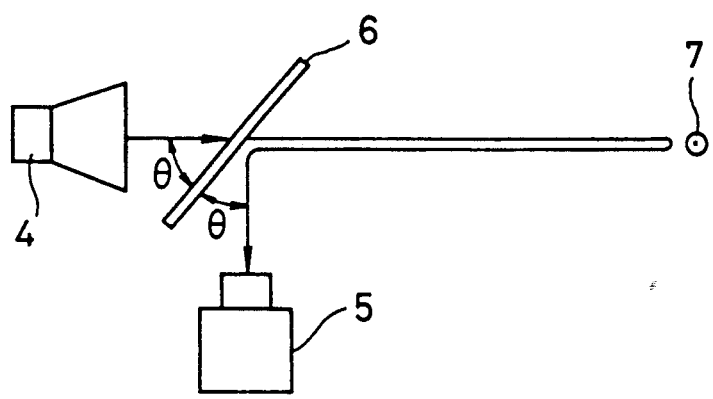

The vehicle 13 is equipped with a visual sensor for detecting the luminous points 1. FIG. 4 shows by way of example a case where a television camera 5 is employed as a visual sensor. To assure that the luminous points 1 are reliably detected by the television camera 5 without influence caused by outside turbulent light, it is preferable that the respective luminous points 1 have a degree of brightness as high as possible. In a case where a luminous member such as a LED or the like is used as a component constituting one luminous point 1, it is required that it has a degree of brightness as high as possible. On the other hand, in a case where a reflective member such as glass bead or the like having a reentrant reflectivity is used as a component constituting one luminous point 1, it is found that a brightness of the luminous point 1 varies substantially in dependence on a positional relationship between light emitting means for illuminating the reflective body and the television camera 5 for detecting the same. This is because of the fact that the reflective body having a reentrant reflectivity reflects the largest quantity of light beam in the same direction as the incident direction of light.

FIG. 4 shows an example wherein a half mirror 6 is placed in front of a light emitter 4 and the television camera 5 and the light emitter 4 are arranged at symmetrical positions relative to the half mirror 6 which is located therebetween. In this case, light emitted from the light emitter 4 passes through the half mirror 6 to illuminate the reflective body 7. Then, the reflected light advances toward the light emitter 4 but it is reflected at the half mirror 6 so that it is then introduced into the television camera 5. At this moment, since the television camera 4 receives the reflected light at the position equivalent to the light emitter 4, the reflective body 7 can be detected as a very bright luminous point. However, in view of the fact that the luminous flux is reduced to a half at every time when light passes through the half mirror 6, a case where the luminous point detecting method as shown in FIG. 4 is advantageously employable will be taken into account in the following.

Figure 5:
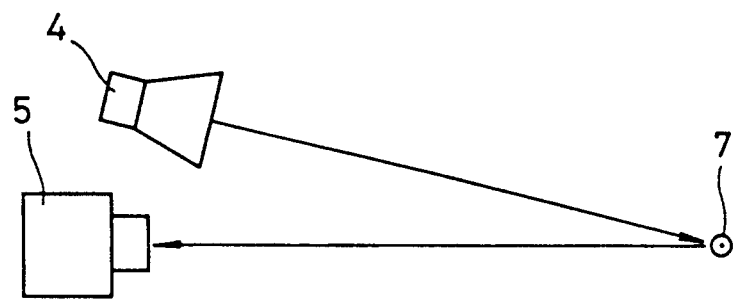

FIG. 5 shows a conventional luminous point detecting method wherein the aforementioned half mirror 6 is not used. Now, it is assumed that a luminous flux of light emitted from the light emitter 4 is represented by I, a luminous flux of outside turbulent light is represented by $I_n$, a reflectivity of the luminous flux of outside turbulant light on the surface of an outside turbulant body is represented by $\eta_n$, a damping rate of the luminous flux of light passing through the half mirror 6 as shown in FIG. 4 is represented by r and reflectivities of luminous flux on reflective bodies 7 in FIGS. 4 and 5 are represented by $\eta$ and $\eta'$·S/N of the luminous flux of light which has been introduced into the television camera 5, i.e., a ratio of the luminous flux of light from the reflective body 7 in the foregoing luminous flux to the luminous flux of reflected light from the outside turbulent body is represented by the following formulas (1) and (2) with respect to the methods as shown in FIGS. 4 and 5.

$$S/N = \frac{\eta \cdot \gamma^2 \cdot I}{\gamma \cdot \eta_n \cdot I_n} = \gamma \cdot \frac{\eta \cdot I}{\eta_n \cdot I_n} \quad (1)$$

$$= \gamma \cdot \eta \cdot A$$

$$S/N = \frac{\eta' \cdot I}{\eta_n \cdot I_n} = \eta' \cdot A \quad (2)$$

where $A = \frac{I}{\eta_n \cdot I_n}$

Consequently, provided that the damping rate r of the half mirror 6 is represented by 0.5, the method as shown in FIG. 4 is advantageously employable under a condition of $0.5 \cdot \eta > \eta'$.

Figure 6:
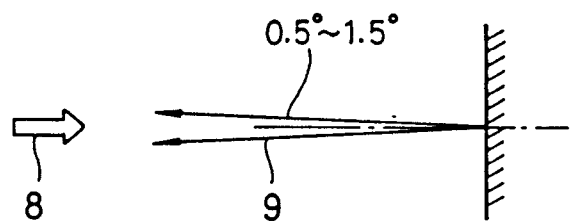

Incidentally, it is generally known that the reflective body having a reentrant reflective property reflects the incident light with a very small divergent angle relative to the direction of incidence of light. For instance, with respect to glass beads or the like placed on the center line of a road, the reflected light 9 has a divergent angle of ± 0.5 to 1.5 degrees relative to the incident light 8, as shown in FIG. 6.

If there exists a long distance between the light emitter 4 and the reflective body 7, the result is that $\eta$ and $\eta'$ have a value near to each other. However, if the distance therebetween is shorter than, e.g., 5 m, $\eta$ becomes very large compared with $\eta'$. Consequently, in a case where the foregoing distance is short, the luminous point detecting method shown in FIG. 4 is advantageously employable compared with the conventional method shown in FIG. 5.

According to the embodiment of the present invention, a distance between the light emitter 4 and the reflective body 7 constituting a luminous point 1 is set to less than 5 m. For the reason, the method as shown in FIG. 4 is employed for practicing the embodiment of the present invention.

Figure 7:
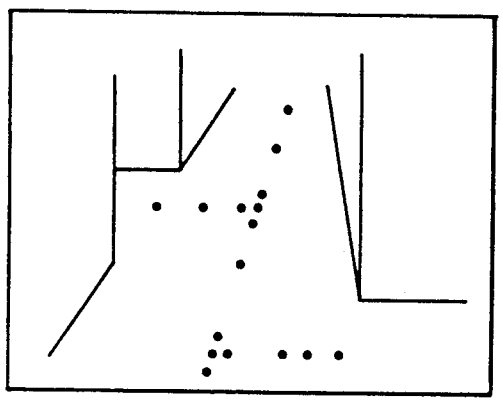
FIG. 7(a) and 7(c) show an image before binarizing and FIG. 7(b) and 7(d) show an image after binarizing.
Figure 7:
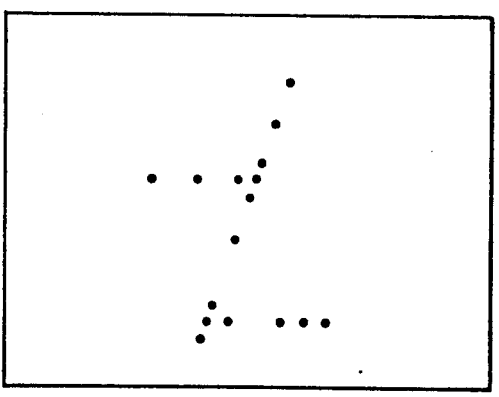
Figure 7:
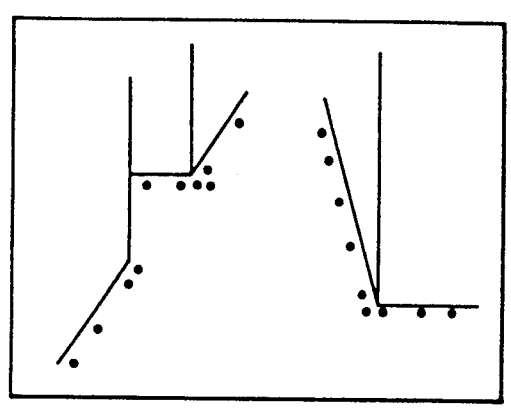
Figure 7:
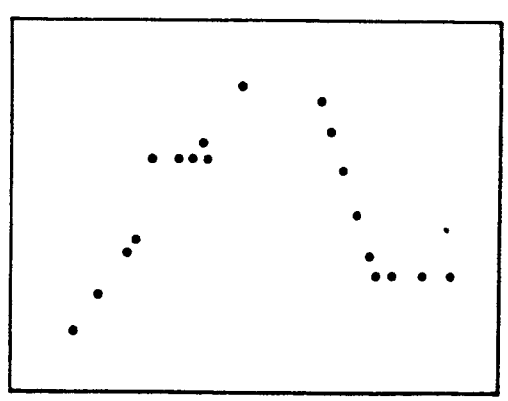
Figure 8:
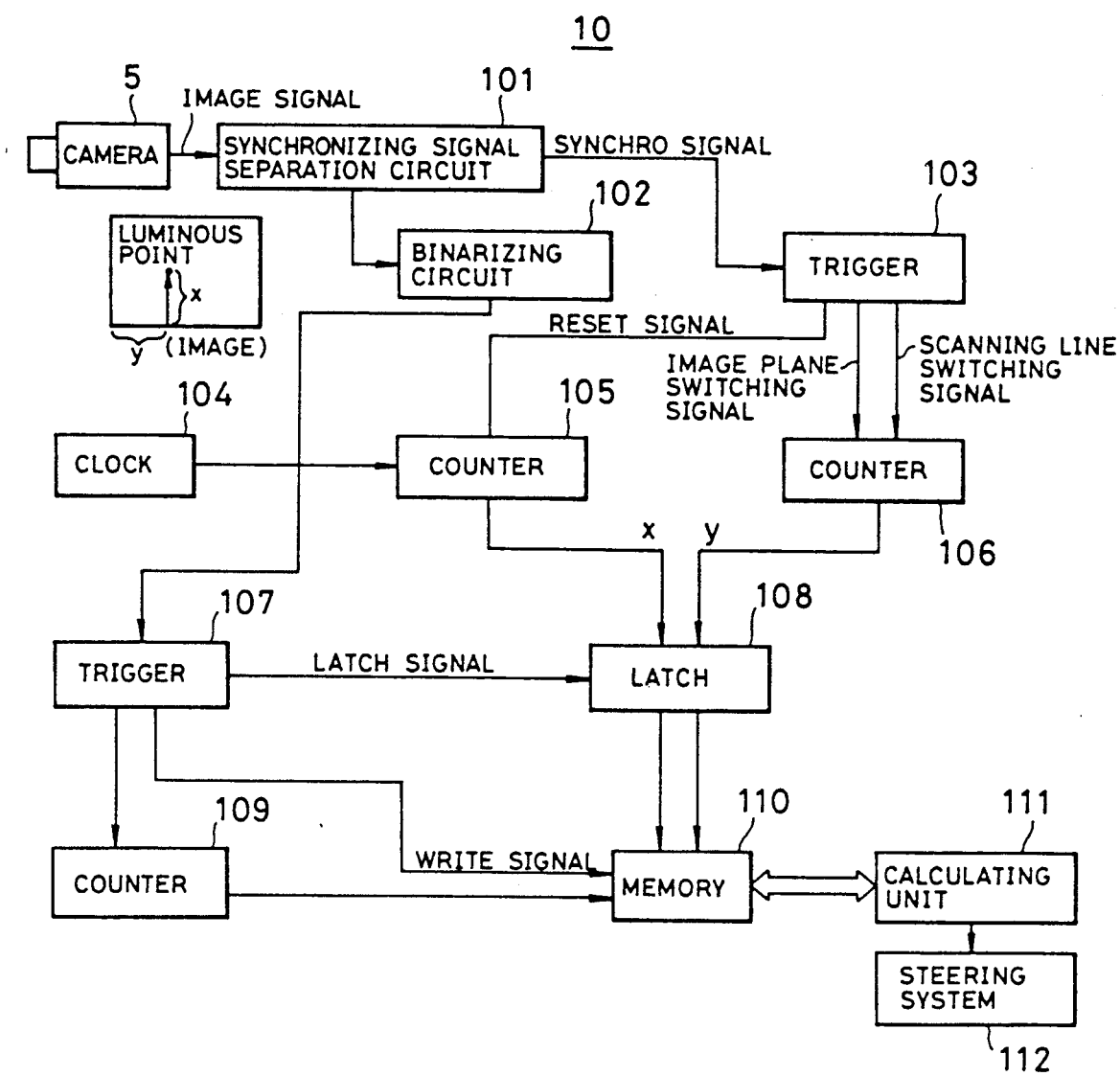
FIGS. 8 is a block diagram illustrating by way of example the structure of an image processing apparatus which is used for practicing the method of the present invention.

FIGS. 7(a) and 7(c) show a case where image planes taken by the television camera 5 are binarized. FIG. 8 shows an image processing apparatus 10 in which coordinates representative of the respective luminous points 1 are obtained by directly processing signals from the television camera 5 in order to obtain positions of the luminous points 1 on the image planes at a high speed.

In FIG. 8, image signals outputted from the television camera 5 are inputted into a synchronized signal separating circuit 101 from which synchronized signals in turn are taken out. The synchronized signals are inputted into a trigger circuit 103 so that reset signals, scanning line switching signals and image plane switching signals are outputted from the trigger circuit 103. It should be noted that the reset signals and the scanning line switching signals are generated on the basis of horizontal synchronized signals and the image plane switching signals are generated on the basis of vertical synchronized signals.

On the other hand, image data outputted from the synchronized signal separating circuit 101 are inputted into a binarizing circuit 102 in which they in turn are converted into binarized signals, i.e., signals representative of whether bright points are present or absent. Then, the binarized signals are inputted into a trigger circuit 107.

A counter circuit 105 counts output pulses from a clock pulse generating circuit 104 from the time when the trigger circuit 103 outputs reset signals, while a counter circuit 106 counts scanning line switching signals from the time when the image switching signals are outputted from the trigger circuit 103.

Consequently, a counted value x derived from the counter circuit 105 represents the position where scanning lines are scanned on the image plane, while a count value y derived from the counter circuit 106 represents the number of scanning lines.

If images indicative of the luminous points 1 are existent on the image plane, output signals from the binarizing circuit 102 vary, causing the trigger circuit 107 to output latch signals into a latch circuit 108. As a result, count positions x and y derived from the counter circuits 105 and 106 are latched in the latch circuit 108 and at the same time the latched content, i.e., date representative of coordinates of the luminous points 1 on the image plane are delivered to data terminals of a memory 110.

On the other hand, the number of luminous points 1 are counted in a counter circuit 109 on the basis of output signals from the trigger circuit 107 so that a counted value derived from the counter circuit 109 is inputted as address data into an address terminal of the memory 110.

At the time when data representative of the positions (x, y) of the luminous points 1 and address data associated with the foregoing data have been prepared, writing signals from the trigger circuit 107 are inputted into the memory 110, whereby the positions (x, y) representative of the luminous points are recorded in the memory 110.

Values of x and y representative of all the luminous points 1 on the one image plane are recorded in the above-described manner at every time when image data covering the whole one image plane are delivered from the television camera 5 and the recorded content is then inputted into a calculating unit 111 including CPU and so forth.

According to the aforementioned image processing, since only the number y of scanning lines on which the luminous points are existent and the positions x indicative of the luminous points on the scanning line are recorded in the memory 110, processing can be achieved at a high speed and circuits required for the processings can be simplified and produced at an inexpensive cost.

Here, description will be made below as to a process of guiding the movement of an unmanned vehicle in a case where a number of luminous points 1 are arranged in such a manner as shown in FIG. 2. Now, it is assumed that the vehicle 13 is located at the central part of a passage 2 in parallel with the latter. A row of luminous points 1 arranged along the passage 2 appears as an image at a predetermined position on the image plane of the television camera (e.g., at the central part of the image plane). Then, the calculating unit 111 stores in a memory (not shown) as informations representative of a reference movement passage the positions (x, y) of images indicative of the respective luminous points 1 in the aforementioned state and obtains linear lines extending between respective positions of the images.

Then, during the movement of the vehicle 13, the positions (x, y) of the images indicative of the respective luminous points 1 are compared with the positions assumed by the aforementioned linear lines to calculate a deviated position of the vehicle and a quantity of deviated angle of the same and prepare a steering command for allowing the deviated position and the quantity of deviated angle to be reduced to a level of zero.

The steering command is inputted into a steering system 112 for the vehicle 13 so that the steering system 112 steers the vehicle 13 so as to allow the latter to move on the central part of the passage 2 at all times.

In this manner, the luminous points 1 arranged along the passage 2 give to the vehicle 13 informations on the movement passage for the latter.

To give to the vehicle 13 informations on an operation command, a plurality of luminous points 1 are arranged in position in a row of arrangement along the passage 2 in compliance with one of arrangement patterns as shown in FIGS. 11(a) through 11(g).

As the luminous points 1 arranged in compliance with one of the foregoing arrangement patterns are taken by the television camera 5, the calculating unit 111 makes a determination on the basis of the content recorded in the memory 110 as to what information on an operation command is involved in the pattern and then gives to the steering system 112 or a movement drive system (not shown) in a predetermined timing an operation command in correspondence to the content of the information. Consequently, the vehicle 13 performs operations corresponding to the content of the foregoing information, e.g., stop, rightward turning, leftward turning or the like.

Next, description will be made below as to a case where a number of luminous points 1 are arranged in such a manner as shown in FIG. 3.

In this case, an image appearing when the vehicle 13 is stopped at the central part of the passage 2 in parallel with the latter is inputted in the same manner as mentioned above and the positions (x, y) indicative of the respective luminous points 1 on the image are stored in the memory 110.

Figure 9:
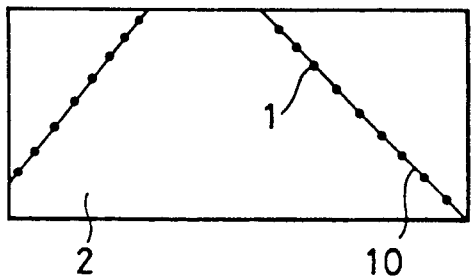
FIGS. 9(a) and 9(b) are views for explaining a method of recording reference images.
Figure 9:
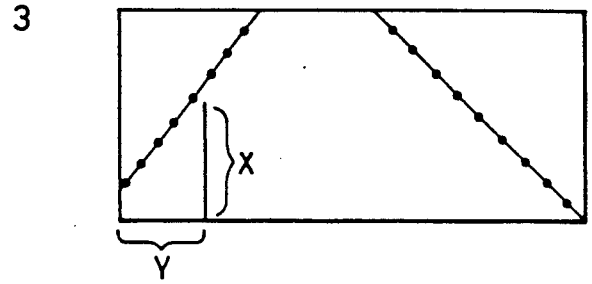
Figure 10:
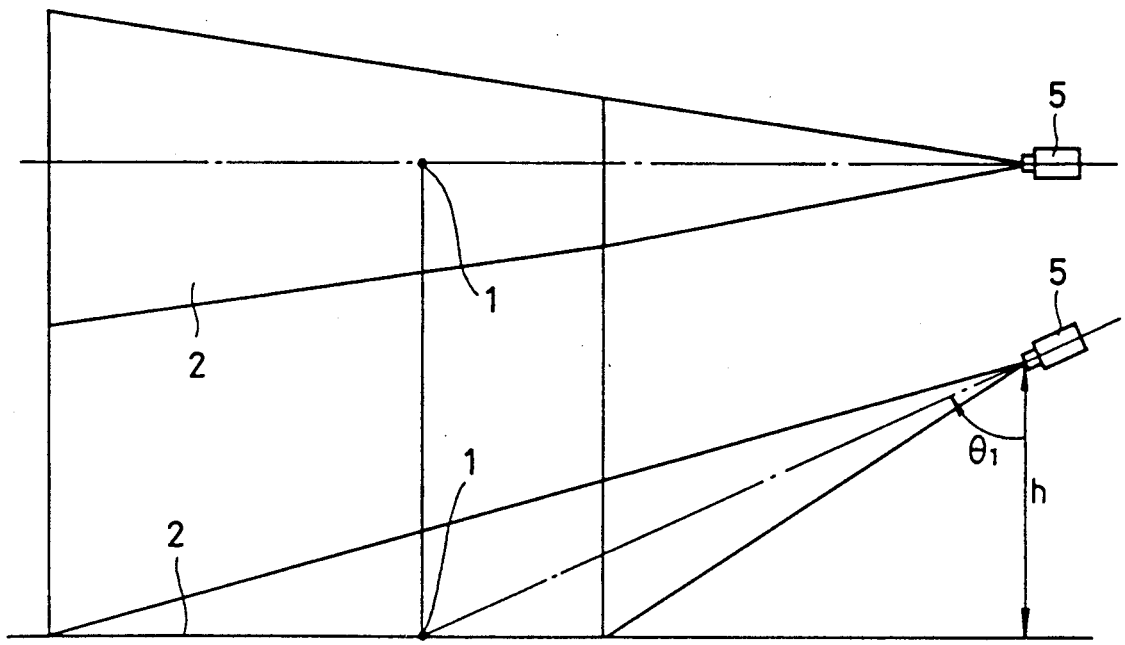
FIG. 10 is a view illustrating a geometrical relationship between luminous points and a television camera.

At this moment, for instance, it is assumed that an image as seen in FIG. 9(a) is stored in the memory 110. In response to this, the calculating unit 111 obtains linear lines extending between the respective luminous points 1, i.e., linear lines indicative of a boundary between the passage surface and the one wall surface and linear lines indicative of a boundary between the passage surface and the other wall surface depending on the aforementioned positions (x, y) of the luminous points 1 on the image plane.

Then, as shown FIG. 9(b) the calculating unit 111 stores the positions Y representative of the respective scanning lines and the positions X representative of the linear lines appearing on the scanning lines in a memory (not shown) in a combined state. Namely, coordinates (X, Y) in the respective linear lines are stored in the memory in the form of reference memories.

Here, when it is assumed that the vehicle 13 moves, the positions (x, y) indicative of the respective luminous points 1 on the image plane taken by the television camera are stored in the memory 110. At this moment, the calculating unit 111 detects a deviated position and a quantity of deviated angle of the vehicle 13 by comparing the coordinates (x, y) with the reference coordinates (X, Y) and prepares a steering command for reducing them to a level of zero. The thus prepared steering command is added to the steering system. As a result, the movement of the vehicle 13 is guided so as to allow it to move at the central part of the passage 2 in parallel with the latter.

As will be apparent from the above description, the luminous points 1 arranged along the boundaries between the passage surface and the wall surfaces as shown in FIG. 3 give to the vehicle 13 informations on the movement passage.

Incidentally, in a case where luminous points 1 arranged in compliance with one of the arrangement patterns shown in FIGS. 11(a) through 11(g) are recognized in an image, an operation command represented by this arrangement pattern is given to the steering system or the movement driving system for the vehicle 13 in the same manner as mentioned above.

If coordinates (x, y) indicative of a certain luminous point 1 on the image plane are already known, a distance between the luminous point 1 and the vehicle 13 can be calculated from the foregoing coordinates. Specifically, provided that a height h of the television camera 5 and a mounting angle THETA of the same are previously known, the distance between the luminous point 1 and the vehicle 13 can be obtained on the basis of the coordinates (x, y) by performing a simple geometrical calculation.

Incidentally, also in a case where a LED or the like light emitting body is used for the luminous points 1, the movement of the vehicle 13 can be guided in the same manner as described above. It is natural that the light emitter 4 is not required in this case.

With respect to the aforementioned embodiments, it is possible to transmit an image taken by the television camera 5 to a remote location using an electric wave. Certainly, this is convenient for monitoring the moving state of the vehicle.

INDUSTRIAL APPLICABILITY

According to the present invention, arrangement of a number of luminous points on the passage surface allows information on guiding for the movement of a vehicle to be given to the latter. Thus, many informations can be transmitted to the vehicle compared with a conventional method with a reduce area on the passage surface occupied by the luminous marks. Further, since a short period of time is required for image processing, the movement of the vehicle can be guided at a high accuracy, even when the vehicle has an increased speed.

We claim:

1. A method of guiding the movement of an unmanned vehicle having a visual sensor by following a number of luminous points, comprising the steps of:
    disposing luminous points at a predetermined interval along a movement passage on which the unmanned vehicle is to travel so as to form a movement passage marker;
    disposing a plurality of the luminous points closely to each other according to a predetermined pattern at a location in the movement passage so as to form an operation command marker;
    setting the unmanned vehicle in parallel with the movement passage and letting the unmanned vehicle pick up a plurality of the luminous points of the movement passage marker by the visual sensor;
    determining a straight line connecting the luminous points of the movement passage marker picked up by the visual sensor based on coordinates of the luminous points;
    calculating a positional deviation and an angular deviation of the unmanned vehicle from the straight line based on coordinates of the luminous points picked up from the movement passage marker when the unmanned vehicle is traveling and the straight line;
    steering the unmanned vehicle such that the positional deviation and the angular deviation are corrected; and
    operating the unmanned vehicle according to the luminous points disposed in the predetermined pattern of the operation command marker when the visual sensor picks up the luminous point pattern while traveling.

2. A method of guiding the movement of an unmanned vehicle by following a number of luminous points as claimed in claim 1, wherein said luminous points are constituted by a reentrant reflective body on which light emitted from light emitting means mounted on said unmanned vehicle is reflected, respectively.

3. A method of guiding the movement of an unmanned vehicle by following a number of luminous points as claimed in claim 2, wherein said reentrant reflective body comprises a glass bead.

4. A method of guiding the movement of an unmanned vehicle by following a number of luminous points as claimed in claim 2, wherein light emitted from said light emitting means is introduced into one of said luminous points through a half mirror, light reflected from said luminous point is reflected further on said half mirror and light reflected from said half mirror is then introduced into said visual sensor.

5. A method of guiding the movement of an unmanned vehicle by following a number of luminous points as claimed in claim 1, wherein said luminous points are constituted by a light emitting body, respectively.

6. A method of guiding the movement of an unmanned vehicle by following a number of luminous points as claimed in claim 5, wherein said light emitting body comprises a LED.

* * * * *